United States Patent

[11] 3,621,226

[72] Inventor Harold Allen Wittlinger
Pennington, N.J.
[21] Appl. No. 878,650
[22] Filed Nov. 21, 1969
[45] Patented Nov. 16, 1971
[73] Assignee RCA Corporation

[54] ANALOG MULTIPLIER IN WHICH ONE INPUT SIGNAL ADJUSTS THE TRANSCONDUCTANCE OF A DIFFERENTIAL AMPLIFIER
11 Claims, 2 Drawing Figs.

[52] U.S. Cl. .......... 235/194, 307/229, 328/160, 330/30
[51] Int. Cl. .......... G06g 7/16
[50] Field of Search .......... 235/194, 195, 196; 307/229, 230; 330/30 D, 130, 69; 328/160, 161

[56] References Cited

UNITED STATES PATENTS

| | | | |
|---|---|---|---|
| 2,891,726 | 6/1959 | Decker et al. | 235/194 |
| 3,202,807 | 8/1965 | Sikorra | 235/194 |
| 3,300,631 | 1/1967 | Vallese | 235/194 |
| 3,303,334 | 2/1967 | Bensing | 235/194 X |
| 3,353,012 | 11/1967 | Baude | 328/160 X |
| 3,368,066 | 2/1968 | Miller et al. | 328/160 X |
| 3,432,650 | 3/1969 | Thompson | 307/229 X |
| 3,526,786 | 9/1970 | Snyder | 328/160 X |

*Primary Examiner*—Joseph F. Ruggiero
*Attorney*—H. Christoffersen

ABSTRACT: An input signal representing one quantity X is applied to two amplifiers for producing an output signal proportional to the difference of the transconductance of the respective amplifiers and the amplitude of the signal. A second input signal representing a second quantity Y is employed to adjust the transconductance of the two amplifiers in a sense and amount such that the net output signal formed by the sum of the two output signals they produce is proportional to the product of X and Y.

INVENTOR
Harold A. Wittlinger
BY H. Christoffersen
ATTORNEY

INVENTOR.
Harold A. Wittlinger
BY H. Christoffersen
ATTORNEY

ANALOG MULTIPLIER IN WHICH ONE INPUT SIGNAL ADJUSTS THE TRANSCONDUCTANCE OF A DIFFERENTIAL AMPLIFIER

CROSS-REFERENCE

An application, Ser. No. 847,479, entitled, Differential Amplifier, filed on Aug. 5, 1969, by Carl Franklin Wheatley, Jr., and assigned to the present assignee describes operational amplifiers using the transconductance principle which may be used to practice the present invention.

BACKGROUND OF THE INVENTION

Analog multipliers are known in the art and are used to perform functions which range from multiplying and dividing to complex function generators and balanced modulators. These multipliers have been made in hybrid form (i.e., partially discrete and partially integrated). However, such circuits have proved to be bulky and extremely expensive to make.

Some monolithic analog multipliers are also presently available, but these have a common-mode offset, that is, the common-mode output voltage is not 0 volts for a zero differential input voltage. To eliminate the effect of common-mode output voltage, the addition of external circuitry is required. The external circuitry may be additional operational amplifiers or other level-shifting circuitry. These add complexity, components and cost to the circuit which is extremely undesirable.

It should also be noted that the common-mode offset is due in part to the method of extracting the signal from the presently available monolithic analog multipliers. That is, the output terminals of these amplifiers is connected to the collector of a transistor which is returned by means of a load resistor to a source of operating potential.

A general object of the present invention is to provide a new and improved multiplier and more particularly one which provides a signal indicative both of the value and sign of the product. Another object of this invention is to provide an analog multiplier in which no level shifting is required and where the common-mode output signal is zero for zero differential input signal.

It is another object of this invention to provide a circuit in which each of the amplifiers used is formed on the same substrate and is of the same configuration.

It is still another object of this invention to provide a multiplier circuit using amplifiers having a high output impedance so that the load is driven by the equivalent of a current generator rather than a voltage source.

SUMMARY OF THE INVENTION

A circuit for producing a signal whose value is proportional to the product of two quantities represented by respective input signals X and Y. One signal X is applied to two amplifiers for producing an output signal proportional to the difference of the transconductance of the respective amplifiers and the signal X. The second signal Y is employed to adjust the transconductance of the two amplifiers in a sense and amount such that the net output signal formed by the sum of the two output signals they produce is proportional to the product of X and Y.

BRIEF DESCRIPTION OF THE DRAWINGS

In accompanying drawings, like reference characters denote like components, and.

DETAILED DESCRIPTION OF THE INVENTION

Figure 1:
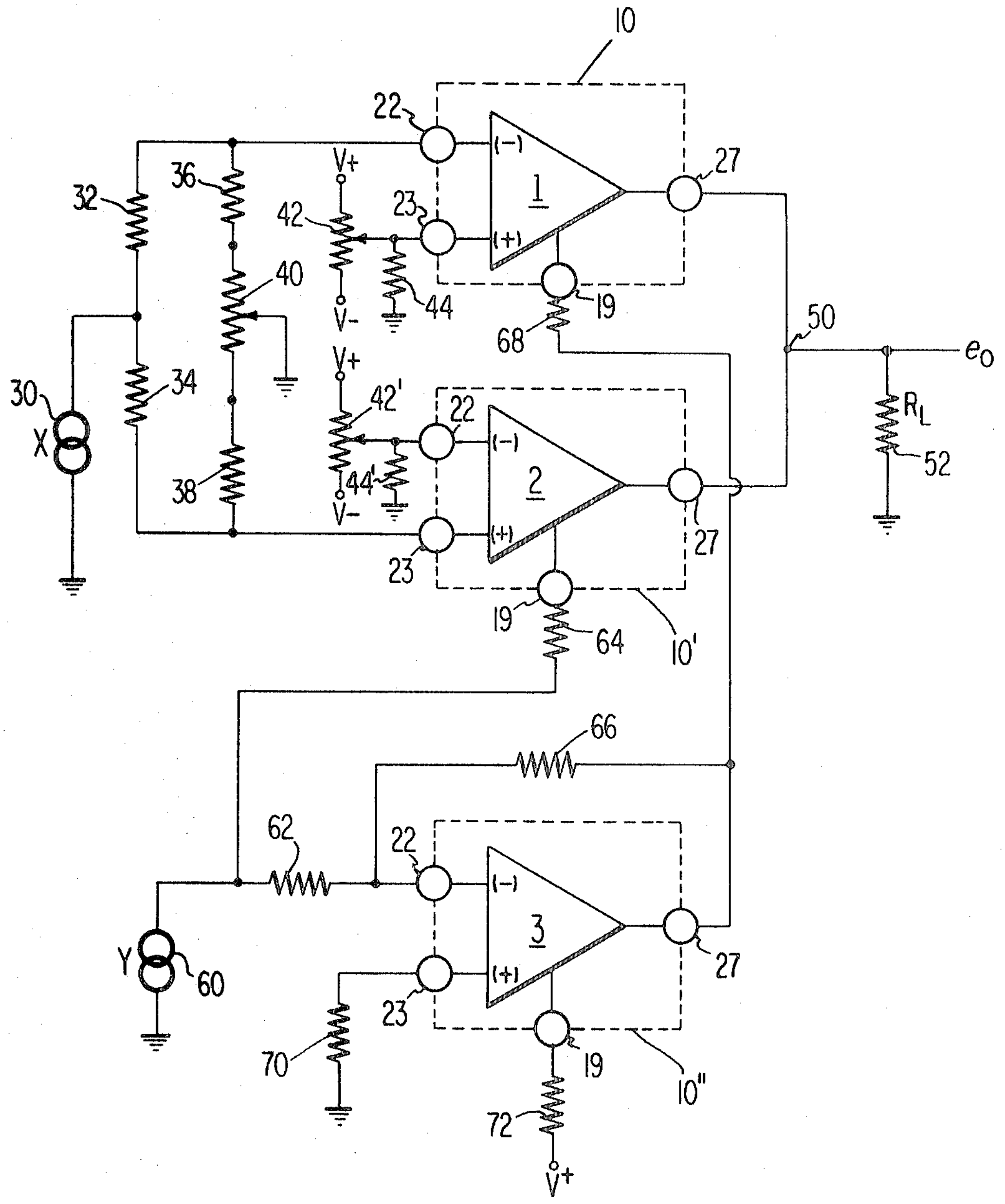
FIG. 1 is a block diagram representation of a four-quadrant multiplier embodying the invention.

An analog multiplier embodying the invention is shown in FIG. 1 and comprises a first amplifier enclosed in dashed box 10, a second amplifier enclosed in box 10′ and a third amplifier enclosed in box 10″. The amplifiers are preferably formed in a monolithic integrated circuit on the same silicon chip, though they could be three different integrated circuits or even discrete amplifiers interconnected as shown.

The general characteristics of the amplifiers used to practice the invention are:

1. Each amplifier has a pair of differential input terminals. One input terminal, 22, denoted by a minus sign, is referred to as the inverting input terminal since signals applied thereto cause an output signal to be produced which is out-of-phase or inverted with respect to said signals, and a second input terminal, 23, denoted by a plus sign, is called the noninverting input terminal since signals applied thereto cause an output signal to be produced which is in-phase with the input.

2. Each amplifier has a bias current terminal 19 for the application thereto of an external bias current which determines the conductivity level and thereby the transconductance ($g_m$) of the amplifier. For, the transconductance of each amplifier is directly proportional to the bias current level. 3. Each amplifier has an output terminal (27, 27′, 24″) for producing an output current signal which is proportional to the product of the transconductance of the amplifier and the differential signal input.

4. Each of the amplifiers is characterized by an extremely high-output impedance as compared to the load impedance and as compared to the relatively low-output impedance of an operational voltage amplifier. As a result, the forward gain characteristic of the amplifiers is best described by transconductance rather than voltage gain. Also, the high-output impedance permits the output terminals of two or more of these amplifiers to be connected in common.

Amplifiers having the above-mentioned characteristics are described in copending application Ser. No. 847,879, assigned to the present assignee, and a typical amplifier is shown in FIG. 2 and discussed below.

Figure 2:
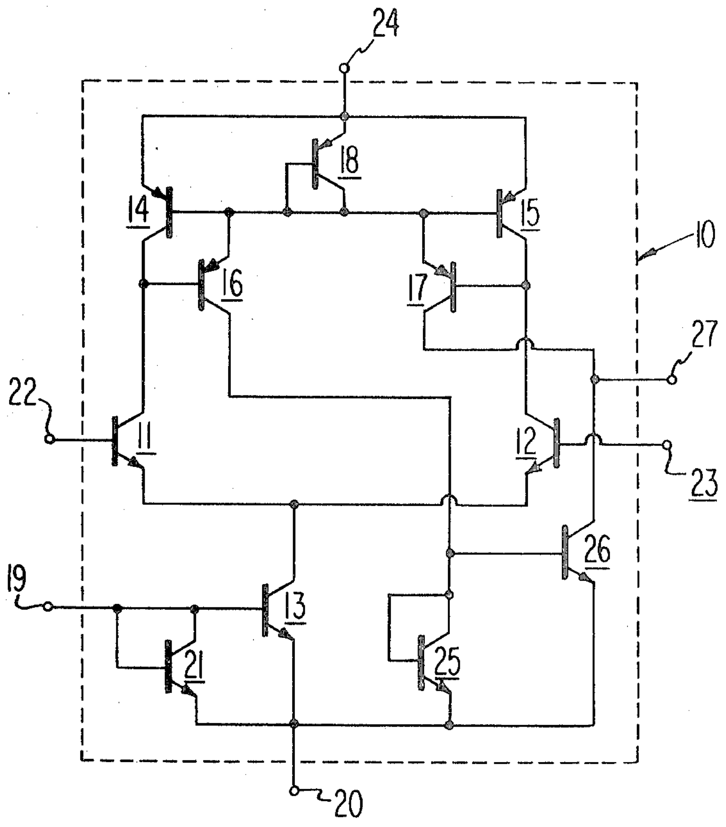
FIG. 2 is a schematic representation of a typical transconductance operational amplifier used in the practice of the invention.

All of the elements within the dashed rectangle 10 of FIG. 2 are formed as an integrated circuit on a single semiconductor chip. The integrated circuit is a differential amplifier including a pair of transistors 11 and 12, a current source transistor 13, and an active load circuit comprising five transistors 14, 15, 16 and 17 and diode 18. An external source of current, not shown in FIG. 2 may be coupled between terminal 19 and common terminal 20 to establish a voltage across transistor 21 which operates as a diode. The latter is connected between the input electrodes of transistor 13.

Since transistors 13 and "diode" 21 are formed on the same semiconductor chip at the same time, their electrical characteristics will be accurately matched. If the transistor 13 and diode 21, in addition, are equal area devices, the emitter current injected into the respective base regions will be equal. The current flow which forward biases transistors 13 and diode 21 establishes equal base-emitter voltage drops and, therefore, equal emitter currents. The emitter current in transistor 13 is equal to the sum of the base and collector currents and most of the emitter current flows to the collector. The current flow between terminal 19 and 20 is equal to the emitter current of diode 21, plus the small base current into transistor 13. Due to the high ratio between base and collector currents in transistor 13 and the equal areas of the transistor 13 and diode 21, the current flow between terminals 19 and 20 and the current in the collector of transistor 13 are substantially equal. Therefore, the current supplied by the current source transistor 13 is easily and accurately determined by the parameters of an external source connected between terminal 19 and common reference terminal 20.

The combination of a diode connected transistor between the base and emitter electrodes of a second transistor will be referred to as a diode-transistor composite, The voltage drop developed between the base and emitter electrodes of a transistor when the transistor is subjected to a significant forward bias current will herein be referred to as $V_{be}$.

The collector current of transistor 13 is supplied to the emitter electrodes of transistor 11 and 12. The current will divide between the transistors 11 and 12, depending upon the difference of signal input voltages applied to the base electrodes of transistors 11 and 12 via input terminals 22 and 23 respectively. If the voltages applied to the input terminals 22 and 23 are equal, the current supplied by the transistor 13 will divide equally between the transistors 11 and 12.

The active load circuit comprising transistors 14, 15, 16 and 17 connects the collector electrodes of transistors 11 and 12 to a source of operating potential connected between terminal 24 and 20. Transistors 14, 15, 16 and 17 are opposite conductivity types compared to transistors 11 and 12.

The transistors 14 and 15 are connected in series with transistors 11 and 12 respectively. The transistors 16 and 17 which are connected in a differential configuration, have their emitter electrodes connected in common to the base electrodes of transistors 14 and 15, and through a diode connected transistor 18 to the operating potential supply terminal 24. The base electrodes of the transistors 16 and 17 are connected respectively to the collector electrodes of transistors 11 and 12.

The collector electrodes of transistor 16 is connected through a diode connected transistor 25 to the reference terminal 20. The diode 25 is connected between the base and emitter electrodes of an output transistor 26. The transistor 26 and the transistor 17 are connected in series, and an output terminal 27 is connected to the collector electrodes of these transistors.

The connection of the transistors 14, 15, 16 and 17 provides a mechanism whereby the conductances of transistors 14 and 15 are automatically set to accommodate the current from transistor 13, which is established by the external source connected between terminals 19 and 20. This is brought about because the base drive for transistors 14 and 15 is controlled by the transistors 16 and 17 as functions of the current through transistors 11 and 12. Even though the current through transistor 13 may be established at any point in a relatively wide range of currents, the voltage across the load transistors 14 and 15 does not change appreciably. The collector to emitter voltage of transistors 14 and 15 is 2 $V_{be}$, which is the sum of the voltage across the base-emitter junctions of transistors 14 and 16 and of transistors 15 and 17. As a result, insignificant common mode signal voltage is developed across transistors 14 and 15.

The collector impedance of transistors 14 and 15 is relatively low for common mode current in that the collector-to-emitter voltage of these transistors is substantially constant for a wide change in common mode current. For differential currents, the transistors 16 and 17 have equal and opposite changes in current so that the base drive to transistors 14 and 15 remains equal and unchanged. As a result, the collector impedance of transistors 14 and 15 to differential mode currents is very high, and substantially all of the differential mode current flows through the base-emitter paths of transistors 16 and 17.

The active load circuit, transistors 14, 15, 16, 17, as described, provides a modulated conductance in accordance with common mode current changes and provides a high-load impedance for differential current flow. This load circuit provides common mode signal rejection over and above the common mode rejection normally provided by the differential amplifier circuit configurations.

As mentioned above, transistors 16 and 17 are connected with their emitters in common and operate as a second differential amplifier the collector currents of which are beta times the difference signal current applied to the base electrodes thereof. A transistor connected as a diode 18 is shown in FIG. 2 connected in series with the emitter collector current path of transistors 16 and 17 and between the base and emitter electrodes of both transistor 14 and transistor 15. Diode 18 is forward biased by the common mode emitter collector current of transistors 16 and 17 and forms in conjunction with transistors 14 and 15 a diode-transistor composite. When diode 18 junction area is made twice the junction area of transistor 14 and transistor 15, then 2 microamperes current flow in diode 18 will establish one microampere current flow in transistor 14 and in transistor 15.

By way of example, if a 2 microampere bias current is established in diode 21, 1 microampere will flow in each of the transistors 11 and 12, and 1 microampere will flow in transistors 14 and 15. Since the diode 18 junction area is twice the base-emitter junction area of transistor 14 and 15 and series connected with transistors 16 and 17, the current in diode 18 is 2 microamperes and equals the sum of 1 microampere in each of the transistors 16 and 17.

The transistor connected as a diode 25 and transistor 26 form a diode-transistor composite having a current gain of unity. Equal quiescent currents flowing from the collectors of transistors 16 and 17 establish a collector current in transistor 26 equal to the transistor 16 collector current. The output impedance of the collectors of transistors 17 and 26 may be very high dependent on the device fabrication. A load circuit is then coupled to an output terminal 27 which is connected in common to the collectors of transistors 17 and 26.

As described above, wide ranges in operating current may be established in transistors 11, 12, 13, 14, 15, 16, 17, 18, 25 and 26. By way of example, the integrated circuit of FIG. 1 has been operated in the range of emitter to collector current of 20 nanoamperes to 400 microamperes.

Since the output collector impedance of transistors 17 and 26 is high, the voltage gain of the operational amplifier is determined by the external load resistance used and may be determined by computation using the transconductance of the amplifier. The transconductance of the amplifier is defined as the change in output current for a change in differential voltage across the input terminals 22 and 23.

The transconductance of that portion of the differential amplifier including only transistors 11 and 12 is where $I_2$ is the emitter current for one of the transistors 11 and 12 in amperes; and where the transconductance is defined as the change in one collector output current for a change in voltage between terminals 22 and 23.

Since the differential collector current flows through the base-emitter paths of transistors 16 and 17, transistors 16 and 17 contribute a beta multiplier to the current gain of the differential amplifier. The output current of transistor 16 flows through the diode 25 to develop an equal and opposite phase output from transistor 26. The output current from transistor 17 then combines with the output current from transistor 26 to drive a load coupled to them through terminal 27. The overall transconductance then is:

$$g_m = \frac{39 \times I_e}{2} \text{ mho.}$$

where $\beta$ is the beta of transistors 16 and 17, and $I_e$ is the emitter current of one of transistors 11 and 12.

An example of the amplifier transconductance available at a transistor 11 current of 1 microampere, if the beta of transistor 16 equals 50 is:

$$g_m = 39 \times 50 \times 1 \times 10^{16} \text{ mho} = 1{,}950 \text{ micro mho.}$$

The voltage gain is then simply output voltage divided by input voltage or:

$$Vo/Vi = g_m R_L$$

where $R_L$ is the output load resistance connected to terminal 27. Thus, the output signal of the amplifier is proportional to the product of the transconductance of the amplifier, the load ($R_L$) and the input signal ($Vi$).

The maximum common mode input which upsets the operation of the differential amplifier input stage is determined by the sustaining voltage characteristics of the current source comprising transistor 13 and the required voltage drop across the load transistors 14 and 15 which both subtract from the available voltage of the supply. In the circuit shown in FIG. 2, input common mode voltages at terminals 22 and 23 may swing to a negative limit equal to the negative source voltage at terminal 20 plus 0.8 volt and to a positive signal limit of the positive source voltage at terminal 24 minus 1.4 volts without upsetting differential amplifier operation. Maximum common mode input is primarily determined by supply voltage reduced by very small magnitudes since both the source transistor 13 and the load transistors 14 and 15 require very small voltage drops for effective operation.

An important feature of the amplifier is that for common mode inputs (i.e., when the signal at terminal 22 equal the signal at terminal 23) the current provided by transistor 17, which acts like a current source, is equal to the current drawn by transistor 26 which acts like a current sink. The net effect of these two current sources is to generate an output signal which is essentially equal to 0.

Returning to FIG. 1, a first source of signal 30, also called the X-input, is coupled by means of resistor 32 to the inverting terminal 22 of amplifier 1, and by means of resistor 34, to the noninverting terminal 23 of amplifier 2. Resistors 36 and 38 and potentiometer 40 connected between the signal input terminals of amplifiers 1 and 2 and ground form an alternating current (AC) balancing resistor network used to null the output for a given input at a fixed bias.

The other differential inputs, terminal 23 of amplifier 1 and terminal 22 of amplifier 2, are respectively returned to a direct current (DC) level balancing networks to take care of the DC offset of the amplifier. Terminal 23 of amplifier 1 is connected to the center tap of potentiometer 42, the other two ends of potentiometer 42 being connected to the $V^+$ and $V^1$ sources of potential are also connected to terminals 24 and 20, respectively, shown in FIG. 2. The center tap of 42 is connected to one end of resistor 44, the other end of which is connected to ground. Varying the center tap of potentiometer 42 thus establishes a DC level at its corresponding input terminal. Terminal 22 of amplifier 2 is similarly connected to potentiometer 42′ and to resistor 44′.

Output terminal 27 of amplifier 1 and output terminal 27′ of amplifier 2 are connected in common to output terminal 50. A load resistor 52 is connected between terminal 50 and ground.

A second source of signal 60, also called the Y-input, is coupled to input terminal 22 of amplifier 3 by means of resistor 62 and to the bias current terminal 19 of amplifier 2 by means of resistor 64. The output terminal 27 of amplifier 3 is coupled back to the input terminal 22 of the amplifier by feedback resistor 66. The output terminal 27 of amplifier 3 is also connected to the bias current terminal 19 of amplifier 1 by resistor 68. Input terminal 23 of amplifier 3 is connected by means of fixed resistor 70 to ground, and the bias current terminal 19 of amplifier 3 is connected by means of resistor 72 to the source of positive operating potential ($V^+$).

Amplifier 3, connected as shown, operates as a standard operational amplifier. The advantage of using an operational transconductance amplifier (OTA) for amplifier 3 is that all the amplifiers can be made on the same silicon chip thus permitting the design and construction of a truly monolithic integrated circuit.

When resistor 66 is made substantially equal to resistor 62, amplifier 3 is operated as a unity gain amplifier with the output of amplifier 3 being the inverse of the input. Thus, any signal (+)Y applied to input terminal 22 of amplifier 3 causes the inverse or negative of that signal (−)Y to be produced at the output terminal.

The signal (+)Y applied to resistor 64 and the complementary signal (−)Y applied to resistor 68 will cause currents to flow into the corresponding bias current terminals 19 at levels which are functions of the respective signal amplitudes divided by the respective values of resistance or impedance connected between each signal source and its terminal 19. Thus, for example, the bias current flowing into amplifier 2 ($I_{ABC_2}$), as shown in FIG. 2, is equal to the amplitude of the signal Y minus the $V_{BE}$ drop of transistor 21 (or 13) minus the amplitude of the negative voltage level $V^1$ at which the terminal 20 is maintained, divided by the ohmic value of the net series resistance which may be assumed to be lumped in resistor 64. Thus, $I_{ABC_2} \cong [Y - V_{BE} - (V^1)]/R_{64}$. Since $V_{BE}$, $V^1$ and resistor 64 are constants, the bias current flowing into amplifier 2 is indeed a function of the applied signal Y. Note that the analysis is similar for the bias current flowing from terminal 27 of amplifier 3, terminal 19 of amplifier 1 except that the current magnitude is a function of (−)Y. In both cases current flows into the terminal 19 because $V^1$ at terminal 20 is more negative than (−)Y.

Amplifiers 1 and 2 are characterized by a relatively high-output impedance such that each amplifier output may be represented by an equivalent circuit comprising a current source whose current is proportional to the transconductance of the amplifier ($g_m$) multiplied by the differential input potential. The equivalent current source output of the operational transconductance amplifier (OTA) with its characteristic high-output impedance permits the output electrodes to be connected in common to load resistor $R_L$. This is a marked advantage over the operation of the standard voltage operational amplifiers whose low-output impedance would cause loading and shorting if the outputs were connected in common. The result is that the output current produced by each amplifier is summed by the resistor.

Thus, the X-input applied to the inverting terminal 22 of amplifier 1 causes an output voltage ($e_{o1}$) to be produced which is proportional to minus the product of the input signal $X$, the transconductance of amplifier 1 ($g_{m1}$) and the load resistor, that is, $e_{o1} = (-)c_1 X g_{m1} R_L$, where $c_1$ is a constant. In similar fashion, the input X applied to the noninverting terminal 23 of amplifier 2 produces an output voltage $e_{o2} = c_2 X g_{m2} R_L$, where $c_2$ is a constant. The net output voltage $e_o$ is the summation of $e_{o1}$ and $e_{o2}$ (i.e., $e_o = e_{o1} + e_{o2}$). By means of the adjustments provided by the balancing networks, the constant $c_1$ and $c_2$ may be made equal. If this is done, the output voltage at terminal 50 is $$e_o = X R_L c\,(g_{m2} - g_{m1}) \qquad \text{eq. 1}$$

where $c = c_1 = c_2$. Therefore, the output voltage ($e_o$) is proportional to the product of an input signal and the difference in the $g_m$ of amplifiers 1 and 2.

It should be appreciated that the $(-)g_m$ term generated by the first amplifier is essential to obtain four-quadrant multiplication. It should also be noted that since $g_m$ can never be negative (or else the amplifier is cutoff), an inverting amplifier is used to generate a $(-)g_m$ term.

The transconductance of these amplifiers is, as discussed above, directly proportional to the amplifier bias current. Thus, by using a second signal to control the bias current level, the output signal may be made a function of the product of two signals.

This is achieved by using amplifier 3 which serves in combination with resistors 64 and 68 to generate a first bias current for amplifier 1 and a second bias current for amplifier 2 which are proportional to an input signal Y.

The transconductance ($g_{m2}$) of amplifier 2 is directly proportional to the bias current level $I_{ABC_2}$ flowing into terminal 19 of amplifier 2; $[g_{m2} = k_2 I_{ABC_2}]$. The transconductance ($g_{m1}$) of amplifier 1 is similarly proportional to the bias current level $I_{ABC_2}$ flowing into terminal 19 of amplifier 1; $[g_{m1} = k_1 I_{ABC_1}]$, where $k_1$ and $k_2$ are constants.

Since $I_{ABC_1}$ is a function of the signal (−)Y divided by the value of resistor 68

$$\left[ I_{ABC_1} = k_3 \left\{ \frac{(-)Y - V'}{R_{68}} \right\} \right]$$

and since $I_{ABC}$ is a function of the signal Y divided by the value of resistor 64

$$\left[ I_{ABC_2} = k_4 \left\{ \frac{Y - V'}{R_{64}} \right\} \right]$$

, the $g_m$ of each amplifier may be expressed as a function of the signal Y. Thus, $$g_{m1}=(-)\frac{k_1k_3}{R_{68}}(Y+V')$$

$$g_{m3}=\frac{k_2k_4}{R_{64}}(Y-V')$$

"where V' is substantially equal to the potential applied to terminal 20 minus the $V_{be}$ drop of either transistor 21 or 13."

Substituting these terms into equation 1 above yields:

$$e_0=XR_{LC}\left[\frac{k_2k^5}{R_{64}}(Y-V')-(-)\frac{k_1k_3}{R_{68}}(Y+V')\right]$$

The values of resistors 64 and 68 may be selected such that $$\frac{k_2k_4}{R_{64}}=\frac{k_1k_3}{R_{68}}=k_5$$

In this case $e_o=2XR_Lck_5Y=k2R_LXY$, where $k=ck_5$. As $R_L$ and 2 are also constants, they may be expressed as a single constant $C=2kR_L$ and the equation for $e_o$ reduces to $$e_o=CXY \qquad eq.\ 2$$

Thus, the output voltage $e_o$ is directly proportional to the product of the X- and Y-input signals. It has thus been shown how three operational transconductance amplifiers may be combined to produce an analog four-quadrant multiplier.

It should be noted that signals X and Y need not be two different signals. To perform a squaring function, X and Y would be the same signal.

While the invention has been illustrated using three amplifiers, it should be appreciated that where the signal and its inverse are available externally, the third amplifier 3 is not needed. Where the second signal and its inverse are available, the connections of resistors such as 64 and 68 to the terminals for these signals provide the required bias currents. It should also be appreciated that resistors 64 and 68 convert the signal into a current proportional thereto and could be replaced by equivalent current sources.

What is claimed is:

1. A circuit for producing a signal having an amplitude and phase proportional to the product of the amplitude and phase of two quantities represented by respective input signals X and Y comprising, in combination:

first single ended amplifier means responsive to said signal X for producing at its single output a current $I_{01}$ which is solely equal to $-c_1 Xg_{m1}$ whereby $I_{01}$ is zero when X is zero and where $c_1$ is a constant, and $g_{m1}$ is the transconductance of said first amplifier means;

second single ended amplifier means responsive to said signal X for producing at its single output a current $I_{02}$ which is solely equal to $c_1 Xg_{m2}$ whereby $I_{02}$ is zero when X is zero and where $g_{m2}$ is the transconductance of said second amplifier means;

means responsive to said signal Y for adjusting the transconductance of said first and second amplifier means for rendering $g_{m1}$ proportional to $-Y$ and $g_{m2}$ proportional to Y; and summing means for summing said output currents including a constant load, $R_L$, coupled to said outputs of said first and second amplifier means for producing a sum signal $e_o=(I_{02}+I_{01})\ R_L=k_1X\ (g_{m2}-g_{m1})-k\cdot X\cdot Y$ where $k_1=R_Lc_1$ and $k$ is a constant.

2. The combination as claimed in claim 1 wherein each of said first and second amplifier means has an inverting and noninverting input terminal, and a current bias terminal for the application thereto of a bias current to control the transconductance;

wherein said input signal X is direct current connected to the inverting terminal of said first amplifier and to the noninverting terminal of said second amplifier; and wherein said summing means includes means for direct current connecting the outputs of said amplifiers in common to said load $R_L$.

3. The combination as claimed in claim 2 wherein said means responsive to said signal Y includes means for producing a bias current into the bias current terminal of said second amplifier that is proportional to the input signal Y, and for producing a bias current into the bias current terminal of said first amplifier that is proportional to the inverse of the input signal Y.

4. A circuit for obtaining the product of input signals applied thereto, comprising:

a single load having first and second terminals;

first and second amplifiers, each amplifier having first and second differential input terminals adapted to receive input signals, a bias current terminal, and an output terminal for producing output signals proportional to the product of: (a) the input signal, (b) the load, and (c) the transconductance of the amplifier, said output signals being in-phase with those signals applied to said first input terminal and the inverse of those signals applied to said second input terminal, each one of said amplifiers further including a current source and a current sink connected to said output terminal, said source and sink for passing the same amounts of current when the signal applied cross said differential input terminals is zero whereby no current flows into or out of said output terminal in the absence of an input signal and for passing different amount of currents when the signal applied across said input terminals is other than zero and characterized by having its transconductance proportional to the bias current flowing into said bias current terminals;

means direct current connecting the output terminals of said amplifiers in common to one terminals of said load, the other terminal of said load being connected to a point of reference potential;

means for applying a first signal to the first input of one of said two amplifiers and to the second input of the other one of said two amplifiers for generating an output signal which is proportional to the product of: (a) said first signal, (b) the impedance of said load, and (c) the difference of the transconductance of said two amplifiers; and a first current source, whose level is proportional to a second signal, connected to the bias current terminal of one of said two amplifiers and a second current source, whose level is proportional to the inverse of said second signal, connected to the bias current terminal of the other one of said two amplifiers for producing a signal across said load circuit which is proportional to the product of the first and second signals.

5. The combination as claimed in claim 4 further including first and second terminals for the application thereto of said second signal and the inverse of said second signal, respectively;

wherein said first and second current sources, each includes an impedance element having a relatively large ohmic value;

wherein one impedance element is connected between said first terminal and the bias current terminal of one of said two amplifiers; and wherein the other impedance element is connected between said first terminal and the bias current terminal of one of said two amplifiers;

6. The combination as claimed in claim 5 wherein said second current source includes a third amplifier of the same type as said first and second amplifiers;

said third amplifier being connected as a unity gain feedback amplifier and wherein said second signal is coupled to the second input terminal of said third amplifier; and wherein the output terminal of said third amplifier is connected to said second terminal.

7. The combination as claimed in claim 4:

wherein said means for applying a first signal to the first input and to the second input of said two amplifiers includes means for direct current connecting said signal to said input terminals.

8. The combination comprising:

a load circuit;

first, second and third integrated circuit amplifiers formed in a single monolithic chip of semiconductor material, said amplifiers having first and second differential input terminals adapted to receive input signals, a bias current terminal, and an output terminal for producing output signals proportional to the product of: (a) the input signal, (b) the load, and (c) the transconductance of the amplifier, the output signals being in-phase with those signals applied to said first input terminal and the negative of those signals applied to said second input terminal, said amplifiers being further characterized by a relatively high-output impedance and in having their transconductance proportional to the bias current level applied to said bias current terminals;

means coupling the output terminals of said amplifier in common to said load circuit;

first and second circuit points each adapted to receive a source of signal;

means coupling a different one of the differential input terminals of said first and second amplifiers to said first circuit point;

means coupling said second circuit point to the second input terminals of said third amplifier;

first impedance means coupled between said second circuit point and the bias current terminal of one of said first and second amplifiers; and second impedance means coupled between the output terminal of said third amplifier and the bias terminal of the other one of said first and second amplifiers for controlling the transconductance of said amplifiers.

9. The combination as claimed in claim 8 further including a feedback element connected between the second input and output terminals of said third amplifier for connecting it as a unity gain operational amplifier.

10. The combination as claimed in claim 9 wherein said first and second impedance means are resistors.

11. The combination as claimed in claim 10 further including points of reference potential wherein the other one of the differential input terminals of said first, second and third amplifiers are connected to said points of reference potential.

* * * * *

UNITED STATES PATENT OFFICE

CERTIFICATE OF CORRECTION

Patent No. 3,621,226 Dated November 16, 1971

Inventor(s) Harold Allen Wittlinger

It is certified that error appears in the above-identified patent and that said Letters Patent are hereby corrected as shown below:

Column 2 line 9 after "sign" insert ---(-)---.

line 13 after "sign" insert ---(+)---.

line 22 change "24" to ---27''---.

column 4 lines 37-41 insert --- $gm = \frac{39 \times I_e}{2}$ mho .

line 42 change "$I_2$" to ---$I_e$---.

lines 53-56 change "$gm = \frac{39 \times I_e}{2}$ mho " to

---$gm = 39\beta I_e$ mho---.

line 63 change "$10^{16}$" to ---$10^{-6}$---.

Column 5 line 34 change "V'" to ---$V^-$ ---.

Column 6 line 3 change "V'" to ---$V^-$ ---.

line 6 change "V'" to ---$V^-$ --- (both occurrences).

line 63 change "$g_{m2}=k_2 I_{ABC}\ 2$" to ---$[g_{m2}=k_2 I_{ABC_2}]$.

line 65 change "$I_{ABC_2}$" to ---$I_{ABC_1}$---.

line 72 change "$I_{ABC}$" to ---$I_{ABC_2}$---.

(Continued)

UNITED STATES PATENT OFFICE

CERTIFICATE OF CORRECTION

Patent No. 3,621,226 Dated November 16, 1971

Inventor(s) Harold Allen Wittlinger

It is certified that error appears in the above-identified patent and that said Letters Patent are hereby corrected as shown below:

(continued, page 2)

Column 7 line 8 between equations, insert ---and---.

line 15 change " $\frac{k_2 k^5}{R_{64}}$ " to --- $\frac{k_2 k_4}{R_{64}}$ ---.

line 26 change "cross" to ---across---.

Signed and sealed this 18th day of July 1972.

(SEAL)
Attest:

EDWARD M.FLETCHER,JR.
Attesting Officer

ROBERT GOTTSCHALK
Commissioner of Patents